US010262234B2

United States Patent
Li et al.

(10) Patent No.: US 10,262,234 B2
(45) Date of Patent: Apr. 16, 2019

(54) AUTOMATICALLY COLLECTING TRAINING DATA FOR OBJECT RECOGNITION WITH 3D LIDAR AND LOCALIZATION

(71) Applicant: Baidu USA LLC, Sunnyvale, CA (US)

(72) Inventors: Dong Li, Sunnyvale, CA (US); Jiaming Tao, Sunnyvale, CA (US); Jiangtao Hu, Sunnyvale, CA (US); Yifei Jiang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 31 days.

(21) Appl. No.: 15/495,653

(22) Filed: Apr. 24, 2017

(65) Prior Publication Data

US 2018/0307944 A1   Oct. 25, 2018

(51) Int. Cl.

| | |
|---|---|
| *G06K 9/62* | (2006.01) |
| *G01S 17/89* | (2006.01) |
| *G01S 19/01* | (2010.01) |
| *G06N 99/00* | (2010.01) |
| *G06K 9/66* | (2006.01) |

(Continued)

(52) U.S. Cl.
CPC ............ *G06K 9/6256* (2013.01); *G01S 17/89* (2013.01); *G01S 19/01* (2013.01); *G05D 1/0088* (2013.01); *G05D 1/024* (2013.01); *G05D 1/0278* (2013.01); *G06K 9/00791* (2013.01); *G06K 9/66* (2013.01); *G06N 99/005* (2013.01); *G06K 2209/27* (2013.01)

(58) Field of Classification Search
CPC .......... G01S 17/89; G01S 17/88; G01S 17/00; G06K 9/6256
See application file for complete search history.

(56) References Cited

U.S. PATENT DOCUMENTS

| | | | |
|---|---|---|---|
| 7,898,437 B2 * | 3/2011 | Okada | G01C 7/04 |
| | | | 340/436 |
| 8,229,663 B2 * | 7/2012 | Zeng | B60W 40/02 |
| | | | 180/168 |

(Continued)

OTHER PUBLICATIONS

Pandey, Gaurav, James R. McBride, and Ryan M. Eustice. "Ford campus vision and lidar data set." The International Journal of Robotics Research 30.13 (2011): 1543-1552.*

(Continued)

*Primary Examiner* — Bobbak Safaipour
(74) *Attorney, Agent, or Firm* — Womble Bond Dickinson (US) LLP

(57) ABSTRACT

In one embodiment, 3D LIDAR data points are collected using a 3D LIDAR device mounted on an ADV, while the ADV is driving within a predetermined proximity. GPS information associated with a number of objects that are located and moving within the proximity surrounding the ADV. The GPS information of the objects may include a location, a speed, and a heading direction of the objects captured at a particular point in time. The objects are associated with at least some of the LIDAR data points based on the GPS information of the objects. The 3D LIDAR data points are then labeled based on a type of the objects, wherein the labeled 3D LIDAR data points are utilized to train a machine-learning algorithm or model to be utilized for object recognition by ADVs.

24 Claims, 10 Drawing Sheets

(51) Int. Cl.
  *G06K 9/00* (2006.01)
  *G05D 1/02* (2006.01)
  *G05D 1/00* (2006.01)

(56) References Cited

U.S. PATENT DOCUMENTS

| | | | | |
|---|---|---|---|---|
| 8,260,539 | B2* | 9/2012 | Zeng | G01S 17/936 |
| | | | | 701/301 |
| 8,788,121 | B2* | 7/2014 | Klinger | G05D 1/104 |
| | | | | 701/3 |
| 9,802,614 | B1* | 10/2017 | Yoon | H04W 4/70 |
| 9,944,317 | B2* | 4/2018 | Lee | B62D 15/0265 |
| 10,031,526 | B1* | 7/2018 | Li | G05D 1/0246 |
| 2016/0275667 | A1* | 9/2016 | Modica | G06F 3/0346 |
| 2017/0101056 | A1* | 4/2017 | Park | B60Q 9/008 |
| 2017/0123429 | A1* | 5/2017 | Levinson | G05D 1/0088 |
| 2017/0305013 | A1* | 10/2017 | Freeman | B25J 9/1664 |
| 2018/0127000 | A1* | 5/2018 | Jiang | B60W 40/09 |
| 2018/0135972 | A1* | 5/2018 | Patel | B60K 35/00 |
| 2018/0136652 | A1* | 5/2018 | Jiang | G05D 1/0088 |
| 2018/0136655 | A1* | 5/2018 | Kim | B60N 2/002 |
| 2018/0143647 | A1* | 5/2018 | Wang | G05D 1/0088 |

OTHER PUBLICATIONS

Geiger, Andreas, Philip Lenz, and Raquel Urtasun. "Are we ready for autonomous driving? the kitti vision benchmark suite." Computer Vision and Pattern Recognition (CVPR), 2012 IEEE Conference on. IEEE, 2012.*

* cited by examiner

800

Drive an ADV around within a predetermined area, while scanning using a 3D LIDAR device a number of objects located within the predetermined area.
801

↓

Collect LIDAR data points via the LIDAR device while scanning the objects within the predetermined area, where the LIDAR data points include information representing the strength of light reflected from the objects.
802

↓

Generate and store the LIDAR data points in a persistent storage device, where at least some of the LIDAR data points can be labeled based on the types of the objects for training object recognition algorithms.
803

FIG. 8

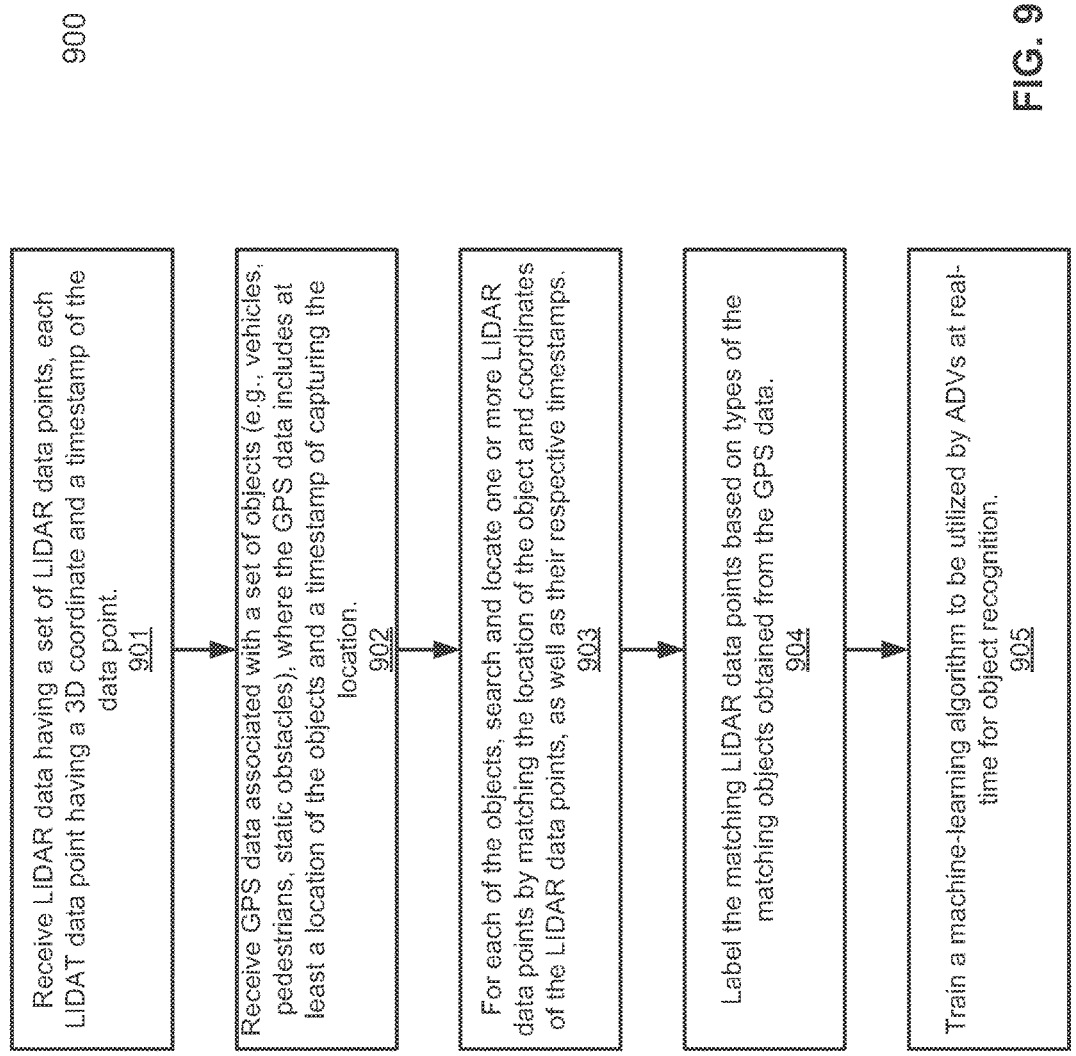

AUTOMATICALLY COLLECTING TRAINING DATA FOR OBJECT RECOGNITION WITH 3D LIDAR AND LOCALIZATION

TECHNICAL FIELD

Embodiments of the present invention relate generally to operating autonomous vehicles. More particularly, embodiments of the invention relate to automatically collecting training data for object recognition with LIDAR.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Recognizing varies types of obstacles with a three-dimensional (3D) light detect and range (LIDAR) is a critical task for autonomous driving. Machine learning techniques are often adopted for such tasks. To improve the recolonization accuracy, a huge amount of data is needed to train machine learning algorithms. How to quickly and automatically obtain such data is a key issue. Currently, people manually label the obstacles on road based on video or 3D LIDAR images. However, such an approach consumes a huge amount of time for people to label the obstacles in the 3D LIDAR data points. Manually labeling the LIDAR data points is error prone. People may not be able to clearly recognize the obstacle on a 3D LIDAR image.

BRIEF DESCRIPTION OF THE DRAWINGS

Embodiments of the invention are illustrated by way of example and not limitation in the figures of the accompanying drawings in which like references indicate similar elements.

FIG. 8 is a flow diagram illustrating a process of labeling 3D LIDAR data points according to another embodiment of the invention.

FIG. 9 is a flow diagram illustrating a process of labeling 3D LIDAR data points according to another embodiment of the invention.

DETAILED DESCRIPTION

Figure 1:
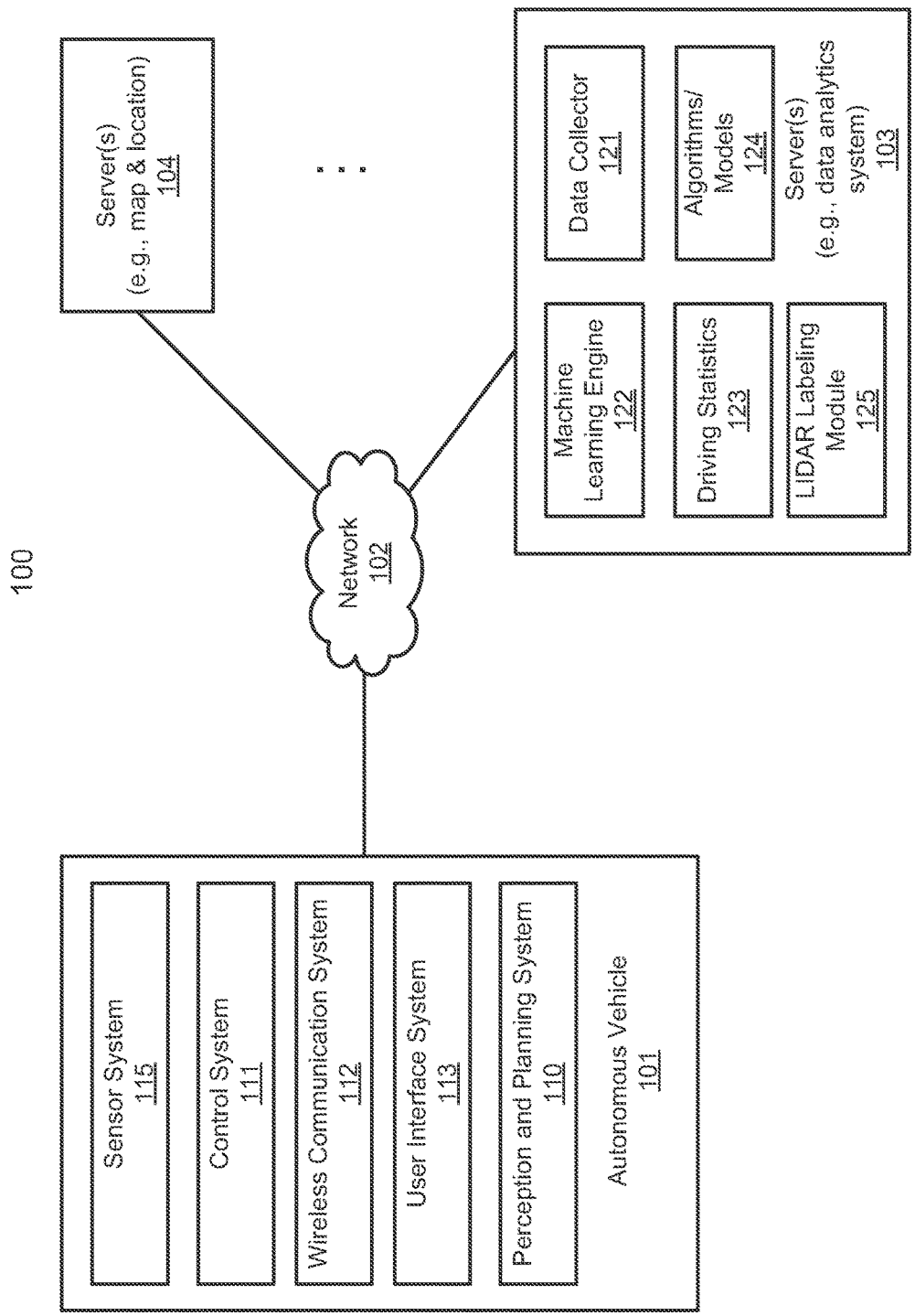
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to one aspect of the invention, a LIDAR data point labeling system is designed and utilized to automatically label 3D LIDAR data points without user intervention. In such a design, an environment or testing environment (referred to as a training area) is established including certain objects that an autonomous driving vehicle (ADV) is interested in, for example, vehicles, static obstacles (e.g., buildings, parked vehicles, street signs), and pedestrians. Each object is equipped with a global positioning system (GPS) transceiver and a local wireless transmitter. The GPS transceiver is utilized to determine a location, a speed (if applicable), and a heading direction (if applicable) based on GPS signals received from a satellite and/or a basestation, generating GPS data associated with the corresponding object. The wireless transmitter is configured to transmit a wireless message or GPS message containing the GPS data to an ADV. In this configuration, each object can emit its object identifier (ID), GPS location, heading direction, and speed through wireless channel.

The ADV will be driving in this predefined environment with a 3D LIDAR device and receives the wireless signals emitted from the objects. Each point in the LIDAR point cloud produced by the 3D LIDAR device has a timestamp and 3D coordinates. Given a LIDAR data point, the received GPS messages are searched to find the objects that have the same or similar 3D coordinates at that timestamp, and if a message is found, the message is utilized to label the LIDAR data point in the point cloud. After labeling each point in the LIDAR point cloud, a set of labeled 3D LIDAR points is generated, which can be used to train machine learning models.

According to one embodiment, 3D LIDAR data points are collected using a 3D LIDAR device mounted on an ADV, while the ADV is driving within a predetermined proximity. GPS information associated with a number of objects that are located and moving within the proximity surrounding the ADV is obtained. The GPS information of the objects may include a location, a speed, and a heading direction of the objects captured at a particular point in time, which may be recorded via a timestamp. The objects are associated with at least some of the LIDAR data points based on the GPS information of the objects. The 3D LIDAR data points are then labeled within the ADV based on a type of the objects. The labeled 3D LIDAR data points are utilized to train a machine-learning algorithm or model to be utilized for object recognition by ADVs.

According to another aspect of the invention, each object records their respective GPS data (e.g., location, speed, and heading direction, and a corresponding timestamp representing the time of the recording), while the object is moving around within the predetermined area. Each object stores the GPS data in a persistent storage device (e.g., hard disks) within the object. Subsequently, the GPS data is downloaded to a data analytics system. Similarly, an ADV collects and records the 3D LIDAR data points using a 3D LIDAR device while the ADV is moving around and scanning objects within the predetermined area. Subsequently, the 3D LIDAR data points are downloaded to the data analytics system. The data analytics system then associates the objects with the 3D LIDAR data points based on the GPS data of the objects (e.g., location, timestamp) and the coordinates of the 3D LIDAR data points. The data analytics system then labels the 3D LIDAR data points based on the type of the objects (e.g., vehicle, pedestrian, static obstacle), which may indicate by the respective object ID. Thus, the association and labeling operations between the objects and the 3D LIDAR data points are performed by a data analytics system offline.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
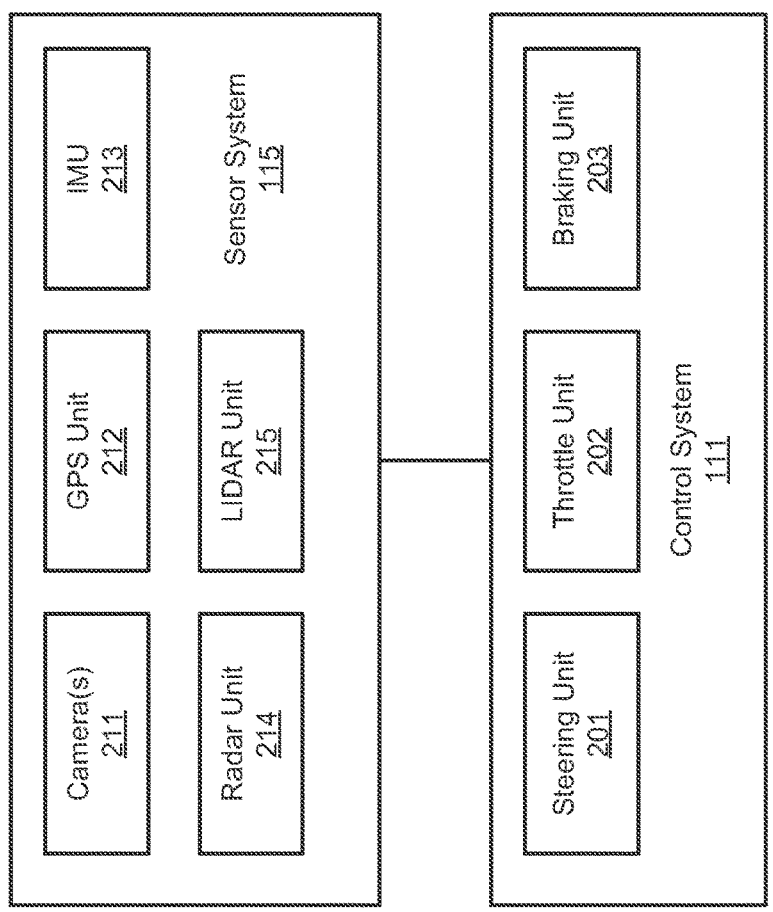
FIG. 2 is a block diagram illustrating an example of an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes, including an algorithm for object recognition by the ADVs. In one embodiment, data collector 121 collects the GPS messages from a variety of objects positioned and moving within a predetermined area, where each object records its location, speed, and/or heading direction based on GPS data obtained via a GPS transceiver attached to the object. In addition, data collector 121 collects 3D LIDAR data points from an ADV navigating and scanning objects within the predetermined area at different points in time. Based on the GPS messages and the 3D LIDAR data points, LIDAR labeling module 125 associates the objects with some of the LIDAR data points and labels the associated LIDAR data points based on the types of the objects (e.g., vehicles, pedestrians, static obstacles). The labeled LIDAR points are then utilized by machine-learning engine 122 to train an object recognition algorithm or model as a part of algorithms or models 124. The object recognition algorithms or models can then uploaded onto various ADVs for online object recognition.

Figure 3:
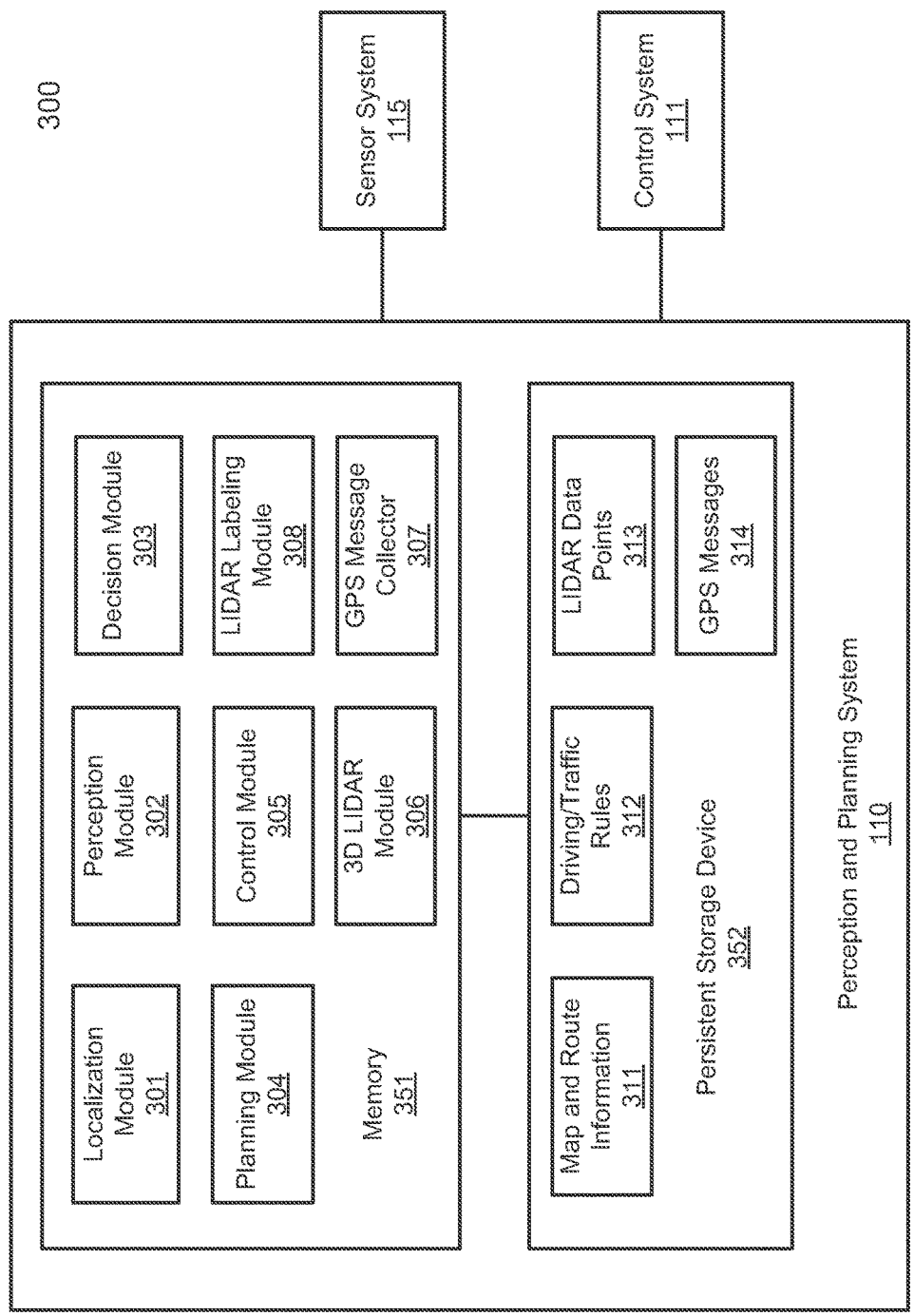
FIG. 3 is a block diagram illustrating an example of a perception and planning system used with an autonomous vehicle according to one embodiment of the invention.

FIG. 3 is a block diagram illustrating an example of a perception and planning system used with an autonomous vehicle according to one embodiment of the invention. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, decision module 303, planning module 304, control module 305, 3D LIDAR module 306, GPS message collector 307, and LIDAR labeling module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules or driving rules 312, which may be stored in persistent storage device 352.

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 304 plans a next route segment or path segment, for example, including a target position and the time required for the ADV to reach the target position. Alternatively, planning module 304 may further specify the specific speed, direction, and/or steering angle, etc. In one embodiment, planning module 304 plans a route segment or path segment for the next predetermined period of time such as 5 seconds. For each planning cycle, planning module 304 plans a target position for the current cycle (e.g., next 5 seconds) based on a target position planned in a previous cycle. Control module 305 then generates one or more control commands (e.g., throttle, brake, steering control commands) based on the planning and control data of the current cycle.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Figure 4:
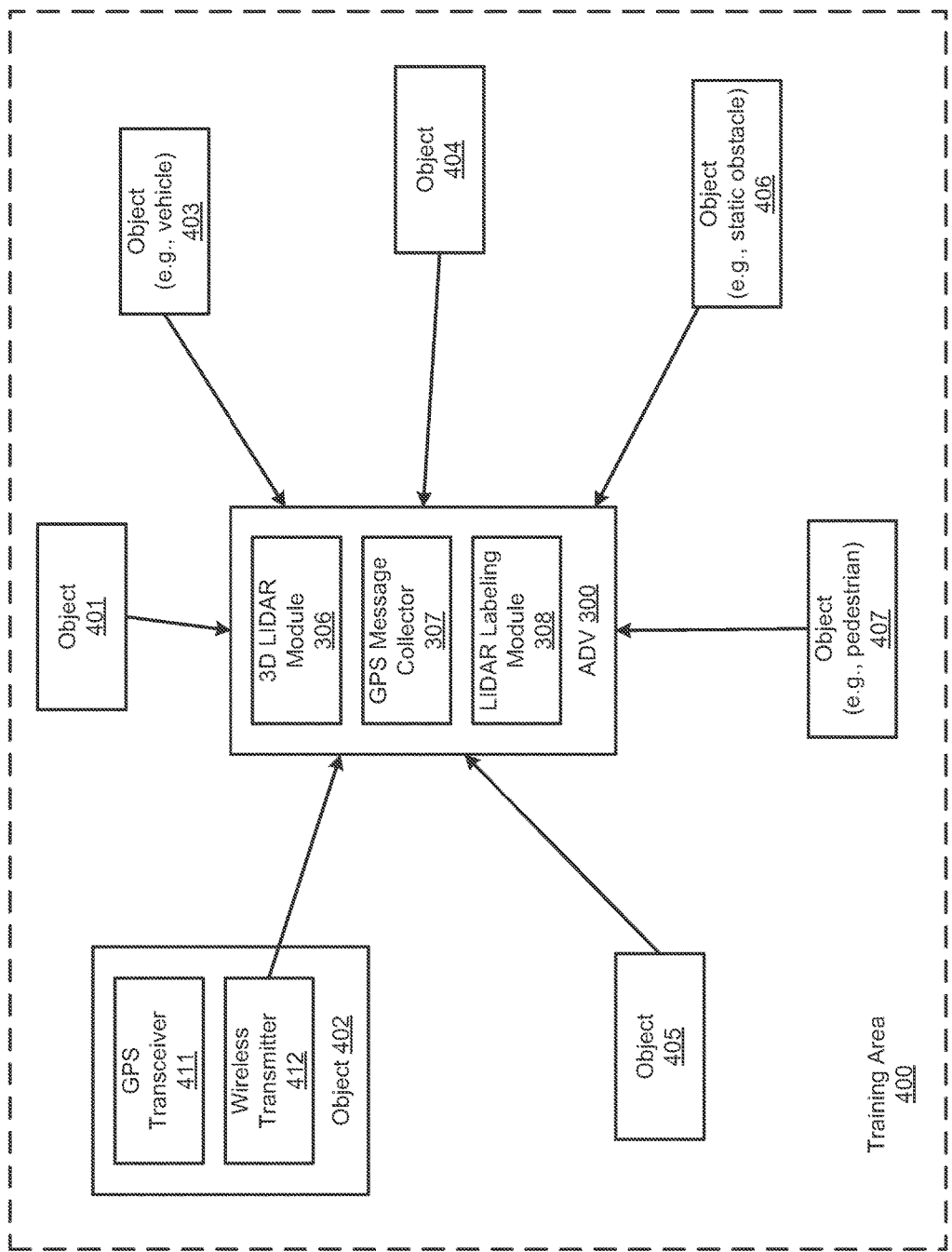
FIG. 4 is a block diagram illustrating a block diagram illustrating a system for associating and labeling LIDAR data points according to one embodiment of the invention.

According to one embodiment, referring to FIGS. 3 and 4, 3D LIDAR module 306 is coupled to or implemented as part of LIDAR unit 215. LIDAR module 306 receives LIDAR data points from LIDAR unit 215 while ADV 300 is driving and navigating within a predetermined area such as LIDAR training or testing area 400. Within predetermined area 400, a set of known objects 401-407 such as vehicles, pedestrians, and static obstacles are geographically located and some of them are moving around within training area 400. LIDAR unit 215 scans training area 400 while ADV 300 is moving around within training area 400 and generates the LIDAR data points. The LIDAR data points are then stored in persistent storage device 352 as part of LIDAR data points 313. Each LIDAR data point may include coordinates (e.g., longitude, latitude, and altitude) of the data points and a timestamp representing the time when the corresponding LIDAR data point was captured. Each LIDAR data point includes information representing a light strength of a reflection from a light beam aimed at an object from a LIDAR device.

In addition, each of objects 401-407 is equipped with a GPS transceiver (e.g., GPS transceiver 411) and a local wireless transmitter (e.g., wireless transmitter 412). The GPS transceiver is utilized to communicate with a GPS satellite and/or a basestation (not shown) to determine its location, speed, and heading direction, etc., generating GPS data. The local wireless transmitter is utilized to transmit a GPS message to ADV 300, where the GPS message includes GPS data representing at least a location of the object. The GPS message may further include an object identifier (ID) identifying the object or a type of the object and a timestamp representing the time when the GPS data is obtained. An object ID may indicate whether the corresponding object is a vehicle, a pedestrian, or a static obstacle, etc. A static obstacle may be fixed or unmoving object such as a parked vehicle, a street sign, a building, a traffic light, a road block, etc.

As shown in FIG. 4, each of objects 401-407 determines its location and a time of recording the location, and transmits a GPS message to ADV 300. The GPS message includes at least the location of the object, a timestamp of the location, and an object ID identifying the corresponding object. In response to the GPS message, LIDAR labeling module 308 associates the object with one or more LIDAR data points based on the GPS message received from the object. In one embodiment, for each GPS message, LIDAR labeling module 308 searches within the LIDAR data points provided by LIDAR module 306 to match the GPS message with one or more LIDAR data points by matching the timestamps of the GPS message with the LIDAR data points and matching a location of the object with coordinates of the LIDAR data points. Once a matched LIDAR data point has been found, LIDAR labeling module 308 labels the LIDAR data point based on a type of the object specified within the GPS message. In other words, LIDAR labeling module 308 labels certain LIDAR data point patterns (e.g., light reflection pattern) to represent a particular type of an object (e.g., vehicle, pedestrian, static obstacle). The labeled LIDAR data points can be utilized to train a machine-learning algorithm for objection recognition, which may be utilized by ADVs at real-time. The above process can be automatically performed without user intervention or a manual process.

Figure 5:
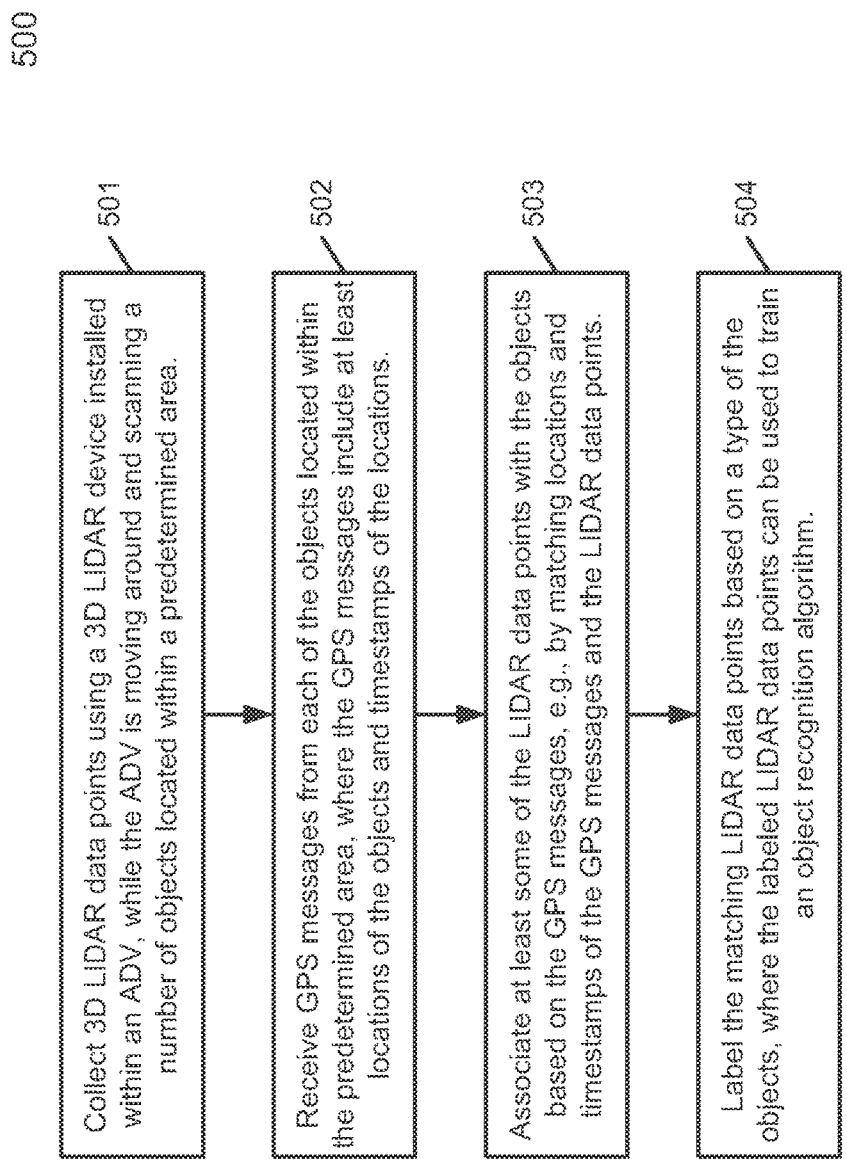
FIG. 5 is a flow diagram illustrating a process of labeling LIDAR data points according to one embodiment of the invention.

FIG. 5 is a flow diagram illustrating a process of labeling LIDAR data points according to one embodiment of the invention. Process 500 may be performed by processing logic which may include software, hardware, or a combination thereof. For example, process 500 may be performed by 3D LIDAR module 306, GPS message collector 307, and/or LIDAR labeling module 308 of ADV 300. Referring to FIG. 5, in operation 501, processing logic collects 3D LIDAR data points using a 3D LIDAR device installed within an ADV, while the ADV is moving around and scanning objects within a predetermined area. The 3D LIDAR device is configured to scan objects located within the predetermined area and to receive light reflected from the objects. In operation 502, processing logic receives GPS messages from the objects located within the predetermined area. Each of the objects is equipped with a GPS transceiver to receive GPS signals from a satellite or a basestation and to determine a location, speed, and/or heading direction of the object. Each object is further equipped with a local wireless transmitter to transmit GPS messages to the ADV, where the GPS messages include at least a portion of the GPS data, a timestamp of the GPS data, and an object ID identifying the object.

In operation 503, processing logic automatically associates at least some of the LIDAR data points with the objects based on the GPS messages received from the objects. In one embodiment, for each of the GPS messages, processing logic matches the GPS message with one or more LIDAR data points based on the location of the object and the coordinates of the LIDAR data points, as well as the timestamps of the GPS message and the LIDAR data points. Once the matching LIDAR data points have been found, in operation 504, processing logic labels the matching LIDAR data points based on the object ID of the object, where the object ID represents the type of the object (e.g., vehicle, pedestrian, or static obstacle). The labeled LIDAR data points are utilized to train a machine-learning algorithm for object recognition by ADVs in real-time.

In the embodiment as described above, each of the objects directly transmits the GPS messages having at least a location of the object and a timestamp representing the recording time of the location to the ADV. The ADV then associates the objects with certain LIDAR data points based on the GPS messages in view of the coordinates and timestamps of the LIDAR data points. The ADV then labels the LIDAR data points based on the type of the objects indicating whether a particular LIDAR data point pattern represents one of the predetermined types of objects, such as, for example, a vehicle, a pedestrian, or a static obstacle.

According to another aspect of the invention, instead of transmitting GPS messages to the ADV to allow the ADV to associate and label the 3D LIDAR data points, each of the objects collects and maintains the GPS data in a local persistent storage device. Similarly, the ADV collects and maintains the 3D LIDAR data points in a local persistent storage device. The GPS data of the objects and the LIDAR data points are then subsequently transmitted to a data analytics system such as data analytics system 103. The association of the objects and the 3D LIDAR data points, as well as labeling of the 3D LIDAR data points, are then performed by the data analytics system offline.

Figure 6:
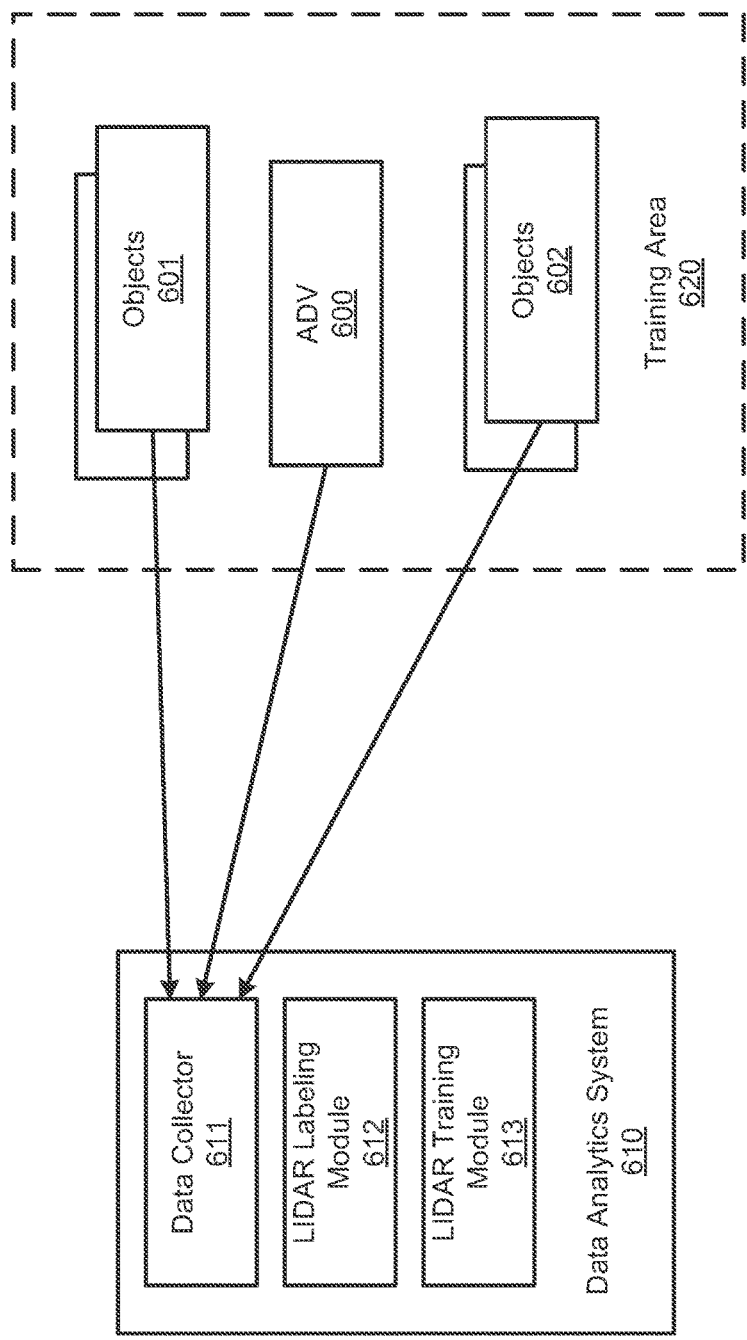
FIG. 6 is a block diagram illustrating a block diagram illustrating a system for associating and labeling LIDAR data points according to another embodiment of the invention.

FIG. 6 is a block diagram illustrating a block diagram illustrating a system for associating and labeling LIDAR data points according to another embodiment of the invention. Referring to FIG. 6, each of objects 601-602 located within training area 620 is equipped with a GPS transceiver to communicate with a GPS satellite and/or a basestation to determine its location, speed, and heading direction. The GPS data having at least the location of the object and a timestamp representing the time of the GPS recording is stored in a persistent storage of the object. Similarly, ADV 600 scans and collects 3D LIDAR data points within training area 600. The 3D LIDAR data points are also buffered and stored in a persistent storage device of the ADV 600.

Subsequently, the GPS data and the LIDAR data points are then downloaded to data analytics system 610 by data collector 611. Based on the 3D LIDAR data points and the GPS data, LIDAR labeling module 612 associates each object with one or more LIDAR data points based on the corresponding GPS data and the coordinates of the LIDAR data points as described above. LIDAR labeling module 612 further labels the LIDAR data points based on the type of the objects. In this configuration, the association and labeling of the LIDAR data points can be performed offline. The labeled LIDAR data points may then be utilized by LIDAR training module 613 to train a machine-learning algorithm for object recognition. The training operations may be performed by data analytics system 610 or alternatively, the training operations can be performed by another system.

Figure 7:
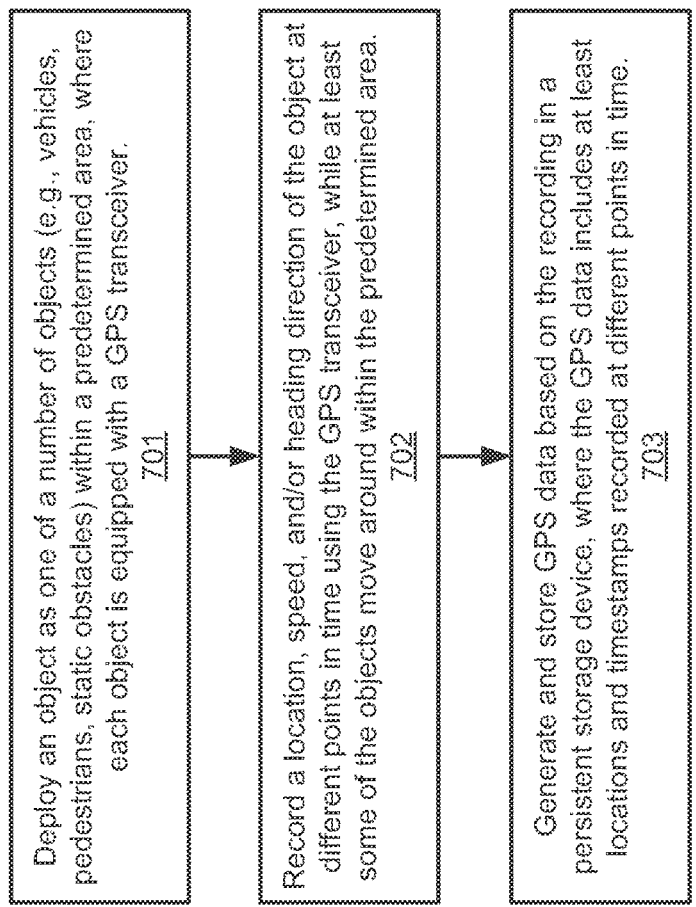
FIG. 7 is a flow diagram illustrating a process of labeling 3D LIDAR data points according to another embodiment of the invention.

FIG. 7 is a flow diagram illustrating a process of labeling 3D LIDAR data points according to another embodiment of the invention. Process 700 may be performed by processing logic which may include software, hardware, or a combination thereof. For example, process 700 may be performed by each of the objects within a training area such as objects 601-602 of FIG. 6. Referring to FIG. 7, in operation 701, processing logic deploys an object as one of a number of objects (e.g., vehicles, pedestrians, static objects) within a predetermined training area, where each of the objects is equipped with a GPS transceiver to communicate a GPS satellite and/or a basestation. In operation 702, processing logic determines a location, speed, and/or heading direction of the object using a corresponding GPS transceiver, while the object may move around within the predetermined area. In operation 703, processing logic generates and stores GPS data recording the locations, speeds, and/or heading directions of the object at different points in time. The GPS data can be utilized subsequently to label 3D LIDAR data points.

FIG. 8 is a flow diagram illustrating a process of labeling 3D LIDAR data points according to another embodiment of the invention. Process 800 may be performed by processing logic which may include software, hardware, or a combination thereof. For example, process 800 may be performed by an ADV such as ADV 600 of FIG. 6. Referring to FIG. 8, in operation 801, processing logic drives an ADV within a predetermined area, while scanning a number of objects (e.g., vehicles, pedestrians, and/or static obstacles) located within the predetermined area using a 3D LIDAR device. In operation 802, processing logic collects LIDAR data points using the LIDAR device while the ADV is moving around within the predetermined area. The LIDAR data points include information representing the strength of light reflected from the objects and coordinates of the light reflections. In operation 803, processing logic generates and stores the LIDAR data points in a persistent storage device, where at least some of the LIDAR data points can be subsequently labeled based on GPS data provided by the objects for training object recognition algorithms.

FIG. 9 is a flow diagram illustrating a process of labeling 3D LIDAR data points according to another embodiment of the invention. Process 900 may be performed by processing logic which may include software, hardware, or a combination thereof. For example, process 900 may be performed by a data analytics system such as data analytics system 610 of FIG. 6 or system 103 of FIG. 1. Referring to FIG. 9, in operation 901, processing logic receives LIDAR data having a number of LIDAR data points, each LIDAR data point including 3D coordinates and a time stamp. In operation 902, processing logic receives GPS data of a number of objects (e.g., vehicles, pedestrians, and/or static obstacles). The GPS data includes a location, speed, and/or heading direction of the objects at different points in time. For each of the objects, in operation 903, processing logic searches and locates one or more LIDAR data points by matching the location of the object and coordinates of the LIDAR data points, as well as their respective timestamps. In operation 905, processing logic labels the LIDAR data point based on the type of the object, for example, indicating whether the corresponding LIDAR data point is associated with a vehicle, a pedestrian, or a static obstacle, etc. In operation 905, the labeled LIDAR data points are utilized to train a machine-learning algorithm for object recognition using a LIDAR device by various ADVs.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 10:
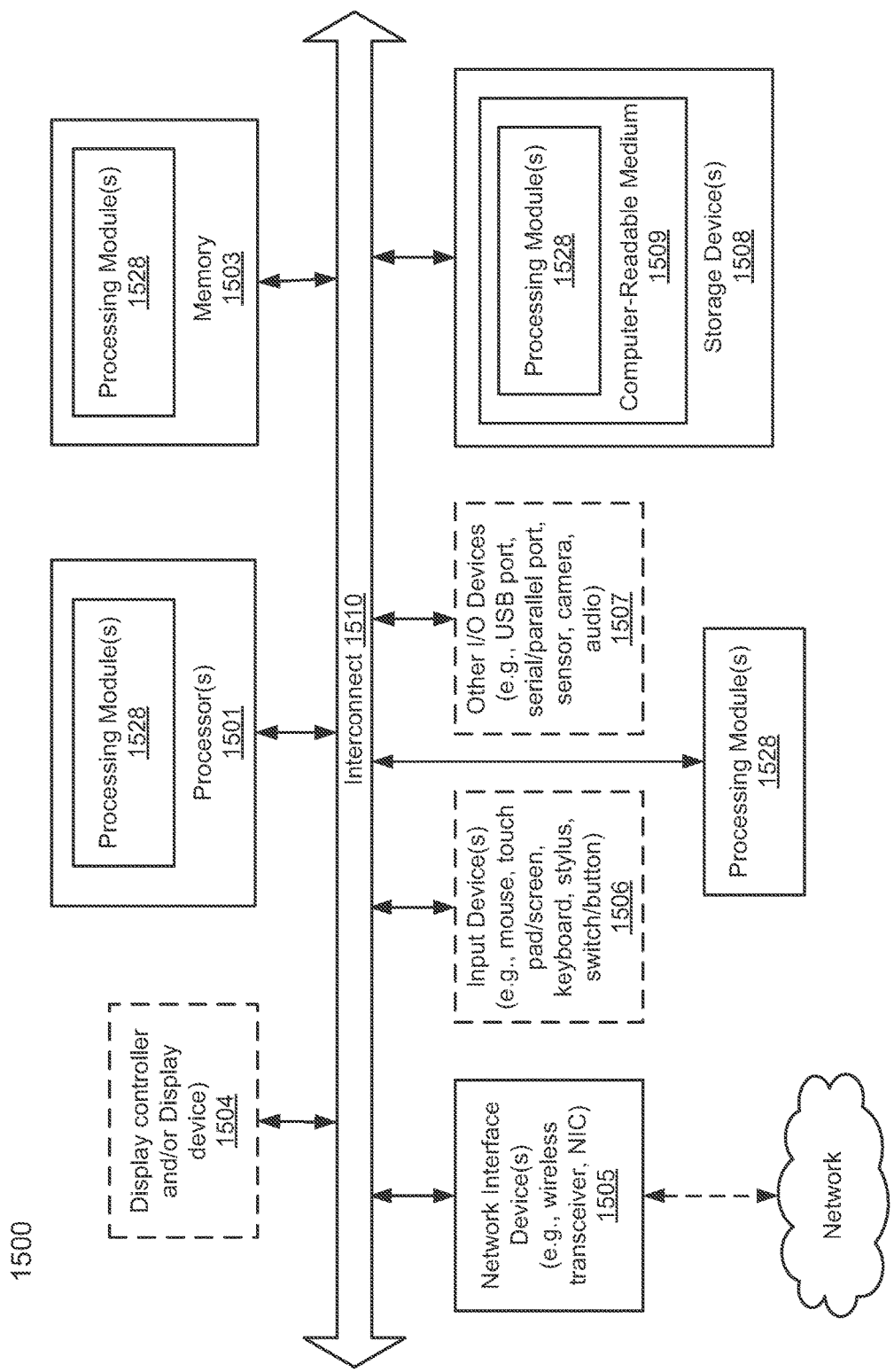
FIG. 10 is a block diagram illustrating a data processing system according to one embodiment.

FIG. 10 is a block diagram illustrating an example of a data processing system which may be used with one embodiment of the invention. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 304, control module 305, LIDAR module 306, and/or LIDAR labeling module 308. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for training object recognition of an autonomous driving vehicle, the method comprising:
   receiving three-dimensional (3D) light detection and range (LIDAR) data points using a 3D LIDAR device installed within an autonomous driving vehicle (ADV), wherein the 3D LIDAR data points include respective coordinates of the 3D LIDAR data points and respective timestamps of capturing the 3D LIDAR data points;
   respectively receiving global positioning system (GPS) messages from a set of objects located within a predetermined proximity surrounding the ADV, wherein each of the GPS messages includes a location of a corresponding object and a timestamp of capturing the location;
   for each of the received GPS messages,
      searching within the 3D LIDAR data points to match the GPS message with at least one of the 3D LIDAR data points by matching the timestamp of the GPS message and the timestamps of the at least one of the 3D LIDAR data points, and matching the location of the object included in the GPS message with the coordinates of the at least one of the 3D LIDAR data points; and
      labeling the at least one of the 3D LIDAR data points based on a type of object specified within the GPS message;
   wherein the labeled 3D LIDAR data points are utilized to train a machine-learning algorithm for a plurality of ADVs to recognize other objects in real-time.

2. The method of claim 1, wherein each of the objects is equipped with a GPS receiver to receive GPS signals from a satellite or a basestation, the GPS signals including geographic location information of the objects.

3. The method of claim 2, wherein receiving the GPS messages of the objects comprises receiving wireless messages from the objects, wherein the wireless messages include GPS information of the objects.

4. The method of claim 3, wherein each of the objects is equipped with a wireless transmitter to transmit a wireless message representing the GPS signals to the ADV.

5. The method of claim 3, wherein the wireless messages further include an object identifier (ID) identifying a type of a corresponding object.

6. The method of claim 5, wherein the type of an object is one of a vehicle, a pedestrian, or a static obstacle.

7. The method of claim 1, wherein the objects are associated with the 3D LIDAR data points based on the coordinates of the 3D LIDAR data points and the GPS messages of the objects.

8. The method of claim 1, wherein each of the 3D LIDAR data points includes information representing a light strength of a reflection from a light beam aimed at an object from the 3D LIDAR device.

9. A non-transitory machine-readable medium having instructions stored therein, which when executed by a processor, cause the processor to perform operations, the operations comprising:
   receiving three-dimensional (3D) light detection and range (LIDAR) data points using a 3D LIDAR device installed within an autonomous driving vehicle (ADV), wherein the 3D LIDAR data points include respective coordinates of the 3D LIDAR data points and respective timestamps of capturing the 3D LIDAR data points;
   respectively receiving global positioning system (GPS) messages from a set of objects located within a predetermined proximity surrounding the ADV, wherein each of the GPS messages includes a location of a corresponding object and a timestamp of capturing the location;
   for each of the received GPS messages, searching within the 3D LIDAR data points to match the GPS message with at least one of the 3D LIDAR data points by matching the timestamp of the GPS message and the timestamps of the at least one of the 3D LIDAR data points, and matching the location of the object included in the GPS message with the coordinates of the at least one of the 3D LIDAR data points; and labeling the at least one of the 3D LIDAR data points based on a type of object specified within the GPS message;

wherein the labeled 3D LIDAR data points are utilized to train a machine-learning algorithm for a plurality of ADVs to recognize other objects in real-time.

10. The machine-readable medium of claim 9, wherein each of the objects is equipped with a GPS receiver to receive GPS signals from a satellite or a basestation, the GPS signals including geographic location information of the objects.

11. The machine-readable medium of claim 10, wherein receiving the GPS messages of the objects comprises receiving wireless messages from the objects, wherein the wireless messages include GPS information of the objects.

12. The machine-readable medium of claim 11, wherein each of the objects is equipped with a wireless transmitter to transmit a wireless message representing the GPS signals to the ADV.

13. The machine-readable medium of claim 11, wherein the wireless messages further include an object identifier (ID) identifying a type of a corresponding object.

14. The machine-readable medium of claim 13, wherein the type of an object is one of a vehicle, a pedestrian, or a static obstacle.

15. The machine-readable medium of claim 9, wherein the objects are associated with the 3D LIDAR data points based on the coordinates of the 3D LIDAR data points and the GPS messages of the objects.

16. The machine-readable medium of claim 9, wherein each of the 3D LIDAR data points includes information representing a light strength of a reflection from a light beam aimed at an object from the 3D LIDAR device.

17. A data processing system, comprising:
a processor; and
a memory coupled to the processor to store instructions, which when executed by the processor, cause the processor to perform operations, the operations including receiving three-dimensional (3D) light detection and range (LIDAR) data points using a 3D LIDAR device installed within an autonomous driving vehicle (ADV), wherein the 3D LIDAR data points include respective coordinates of the 3D LIDAR data points and respective timestamps of capturing the 3D LIDAR data points;

respectively receiving global positioning system (GPS) messages from a set of objects located within a predetermined proximity surrounding the ADV, wherein each of the GPS messages includes a location of a corresponding object and a timestamp of capturing the location;

for each of the received GPS messages,
searching within the 3D LIDAR data points to match the GPS message with at least one of the 3D LIDAR data points by matching the timestamp of the GPS message and the timestamps of the at least one of the 3D LIDAR data points, and matching the location of the object included in the GPS message with the coordinates of the at least one of the 3D LIDAR data points; and labeling the at least one of the 3D LIDAR data points based on a type of object specified within the GPS message;

wherein the labeled 3D LIDAR data points are utilized to train a machine-learning algorithm for a plurality of ADVs to recognize other objects in real-time.

18. The system of claim 17, wherein each of the objects is equipped with a GPS receiver to receive GPS signals from a satellite or a basestation, the GPS signals including geographic location information of the objects.

19. The system of claim 18, wherein receiving the GPS messages of the objects comprises receiving wireless messages from the objects, wherein the wireless messages include GPS information of the objects.

20. The system of claim 19, wherein each of the objects is equipped with a wireless transmitter to transmit a wireless message representing the GPS signals to the ADV.

21. The system of claim 19, wherein the wireless messages further include an object identifier (ID) identifying a type of a corresponding object.

22. The system of claim 21, wherein the type of an object is one of a vehicle, a pedestrian, or a static obstacle.

23. The system of claim 17, wherein the objects are associated with the 3D LIDAR data points based on the coordinates of the 3D LIDAR data points and the GPS messages of the objects.

24. The system of claim 17, wherein each of the 3D LIDAR data points includes information representing a light strength of a reflection from a light beam aimed at an object from the 3D LIDAR device.

* * * * *